(12) United States Patent
Kato et al.

(10) Patent No.: US 11,400,966 B2
(45) Date of Patent: Aug. 2, 2022

(54) HANDCART

(71) Applicant: Makita Corporation, Anjo (JP)

(72) Inventors: Susumu Kato, Anjo (JP); Tomonobu Nashimoto, Anjo (JP); Kohei Oishi, Anjo (JP); Yasuo Ifuku, Anjo (JP)

(73) Assignee: MAKITA CORPORATION, Anjo (JP)

( * ) Notice: Subject to any disclaimer, the term of this patent is extended or adjusted under 35 U.S.C. 154(b) by 61 days.

(21) Appl. No.: 16/986,455

(22) Filed: Aug. 6, 2020

(65) Prior Publication Data
US 2021/0039698 A1    Feb. 11, 2021

(30) Foreign Application Priority Data
Aug. 8, 2019 (JP) .............................. JP2019-146886

(51) Int. Cl.
*B62B 3/02* (2006.01)
*B62B 5/06* (2006.01)

(52) U.S. Cl.
CPC . *B62B 3/02* (2013.01); *B62B 5/06* (2013.01)

(58) Field of Classification Search
CPC .................................... B62B 3/02; B62B 5/06
See application file for complete search history.

(56) References Cited

U.S. PATENT DOCUMENTS

| | | | | |
|---|---|---|---|---|
| 3,323,837 A * | 6/1967 | Landry | ...................... | B62B 1/24 298/2 |
| 4,645,264 A * | 2/1987 | Morrison | .................. | B60P 1/16 165/41 |
| 4,811,988 A * | 3/1989 | Immel | ....................... | B62B 3/08 180/19.1 |
| 4,943,118 A * | 7/1990 | Davis | ........................ | B60P 1/32 298/1 A |
| 5,350,030 A * | 9/1994 | Mawhinney | .............. | B62B 1/24 180/19.3 |
| 6,257,358 B1 * | 7/2001 | Roach | .................. | B62D 51/005 180/19.1 |
| 8,066,301 B1 * | 11/2011 | Westermann | .......... | A61G 5/127 280/657 |
| 8,444,166 B1 * | 5/2013 | Jarvis | ....................... | B62B 3/02 280/415.1 |
| 9,248,850 B1 * | 2/2016 | Romas | ....................... | B62B 1/22 |
| 9,463,730 B2 * | 10/2016 | Romas | ...................... | B62B 1/24 |
| 2006/0006726 A1 * | 1/2006 | Garvey | .................... | B62B 1/24 298/2 |

(Continued)

*Primary Examiner* — Erez Gurari
(74) *Attorney, Agent, or Firm* — Sughrue Mion, PLLC (57) ABSTRACT

A handcart may include a support frame, an actuator, a rotating frame configured to be rotated relative to the support frame by the actuator and a container configured to be rotated relative to the support frame. The container may be configured to be rotated with the rotating frame relative to the support frame when the rotating frame is rotated relative to the support frame by the actuator. The rotating frame may be rotatable up to a position at which an angle between the support frame and the rotating frame becomes a first rotation angle. The container may be rotatable up to a position at which an angle between the support frame and the container becomes a second rotation angle, the second rotation angle being greater than the first rotation angle.

8 Claims, 7 Drawing Sheets

(56) References Cited

U.S. PATENT DOCUMENTS

| | | | |
|---|---|---|---|
| 2008/0084038 A1* | 4/2008 | Byers | B62B 3/12 280/47.34 |
| 2008/0265537 A1* | 10/2008 | Lin | B62B 1/24 280/47.31 |
| 2009/0079254 A1* | 3/2009 | Jacobs | B62D 33/0625 298/18 |
| 2014/0231164 A1* | 8/2014 | Michel, Jr. | B62B 5/0036 180/218 |
| 2016/0144757 A1* | 5/2016 | Romas | B62B 1/24 298/2 |
| 2018/0079439 A1* | 3/2018 | Dettner | B62B 1/24 |
| 2021/0039697 A1* | 2/2021 | Shibata | B62B 5/0053 |
| 2021/0039701 A1* | 2/2021 | Ifuku | B62B 5/06 |
| 2021/0094602 A1* | 4/2021 | Umehara | B62B 5/0043 |

* cited by examiner

HANDCART

CROSS-REFERENCE TO RELATED APPLICATION

This application claims priority to Japanese Patent Application No. 2019-146886 filed on Aug. 8, 2019, the contents of which are hereby incorporated by reference into the present application.

TECHNICAL FIELD

The technique disclosed herein relates to hand cart.

DESCRIPTION OF RELATED ART

U.S. Pat. No. 4,645,264 describes a handcart including a support frame, an actuator, and a container that is rotated relative to the support frame by the actuator.

SUMMARY

In a handcart as described in U.S. Pat. No. 4,645,264, it is desirable to greatly tilt the container forward to unload soil, fertilizer, and the like in the container. Tilting the container relative to the support frame causes a position of a center of gravity of the handcart to shift forward. Thus, when the container is greatly tilted relative to the support frame, the position of the center of gravity of the handcart is greatly shifted forward. A large forward shift of the center of gravity of the handcart may cause a rear portion of the handcart to lift up.

The disclosure herein provides a technique that can improve safety on use of a handcart.

A handcart disclosed herein may comprise: a support frame; an actuator; a rotating frame configured to be rotated relative to the support frame by the actuator; and a container configured to be rotated relative to the support frame. The container may be configured to be rotated with the rotating frame relative to the support frame when the rotating frame is rotated relative to the support frame by the actuator. The rotating frame may be rotatable up to a position at which an angle between the support frame and the rotating frame becomes a first rotating angle. The container may be rotatable up to a position at which an angle between the support frame and the container becomes a second rotating angle, the second rotating angle being greater than the first rotating angle.

In the above-described configuration, the rotating frame is rotated relative to the support frame by the actuator, and when the angle between the support frame and the rotating frame becomes the first rotation angle, the angle between the support frame and the container becomes substantially equal to the first rotation angle. The maximum rotation angle of the rotating frame relative to the support frame is the first rotation angle which is smaller than the second rotation angle. Since the maximum rotation angle of the rotating frame relative to the support frame is relatively small, the position of the center of gravity of the handcart is suppressed from greatly shifting forward even when the rotating frame is rotated relative to the support frame by the actuator. Thus, lifting of the rear portion of the handcart can be suppressed. Accordingly, safety on use of the handcart can be improved. In addition, since the maximum rotation angle of the container relative to the support frame is relatively large, a lot of soil, fertilizer, and the like in the container can be unloaded, which is highly convenient for a user.

DETAILED DESCRIPTION

In one or more embodiments, the handcart may further comprise a front wheel and a rear wheel. Under a state where the angle between the support frame and the rotating frame is the first rotating angle and the angle between the support frame and the container is substantially equal to the first rotating angle, a center of gravity of the handcart may be positioned rearward of a rotational axis of the front wheel.

The above configuration can surely prevent a rear portion (i.e., the rear wheel) of the handcart from lifting up, even when the rotating frame is rotated relative to the support frame by the actuator. Thus, the configuration can further improve safety on use of the handcart.

In one or more embodiments, the container may comprise a handle configured to be gripped by a user.

The above configuration enables a user to easily rotate the container.

In one or more embodiments, a rotation axis of the rotating frame about which the rotating frame is rotated relative to the support frame substantially coincides with a rotation axis of the container about which the container is rotated relative to the support frame.

The above configuration allows the rotating frame and the container to be attached to the support frame. This simplifies the configuration of the handcart.

Embodiment

Figure 1:
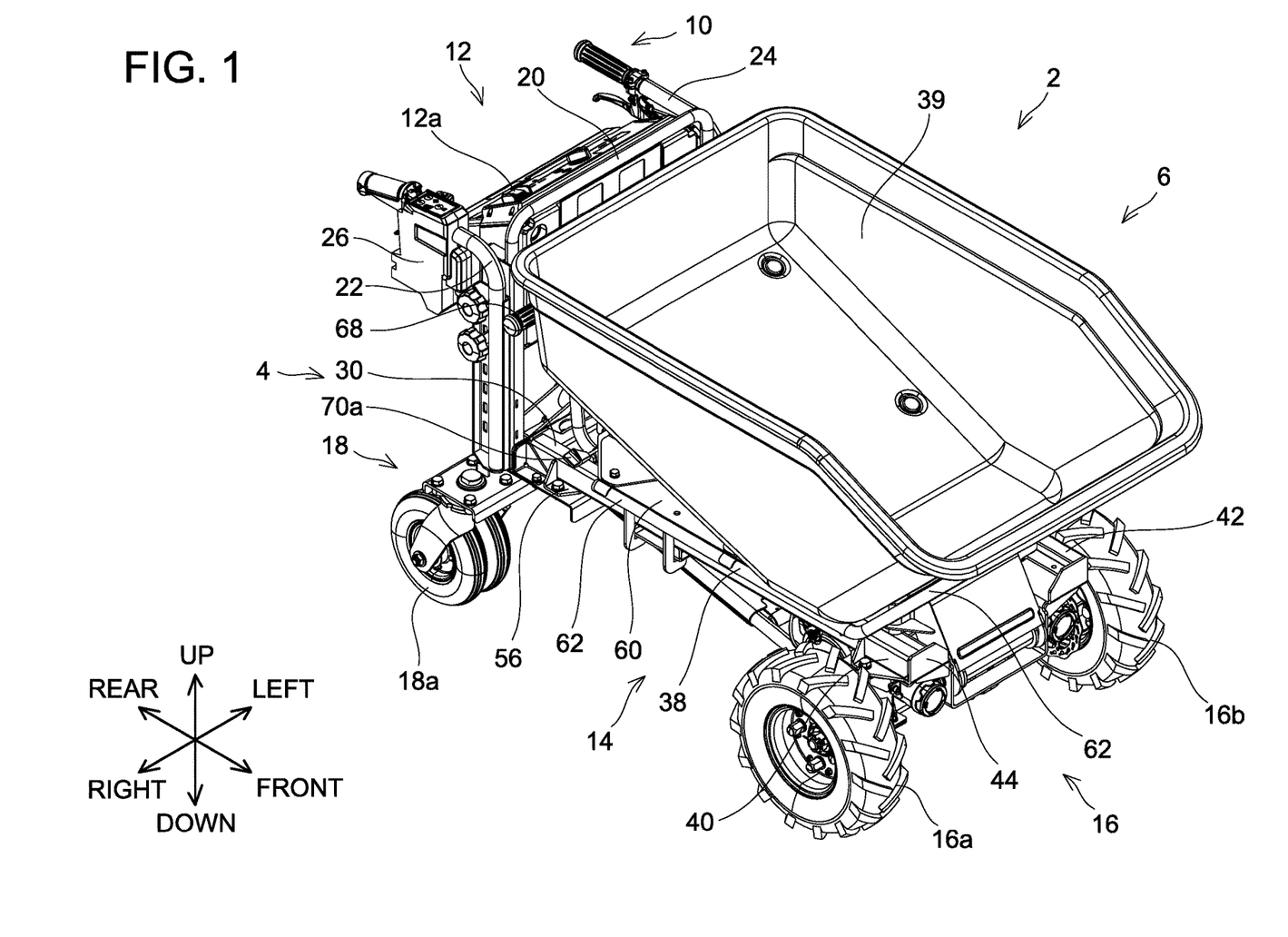
FIG. 1 is a perspective view of a cart 2 according to an embodiment, when the cart 2 is viewed from upper-front-right side.
Figure 2:
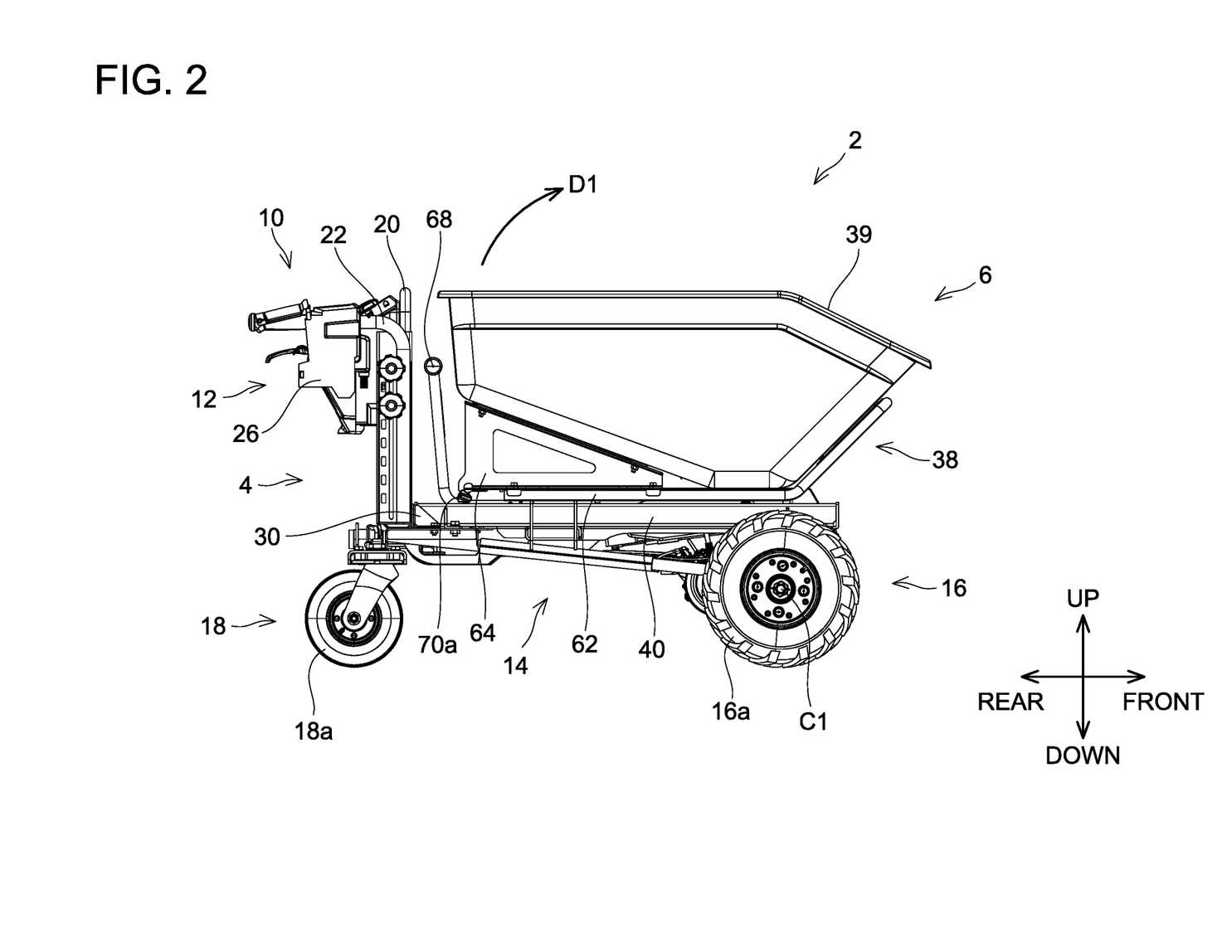
FIG. 2 is a right side view of the cart 2 in the state of FIG. 1.
Figure 3:
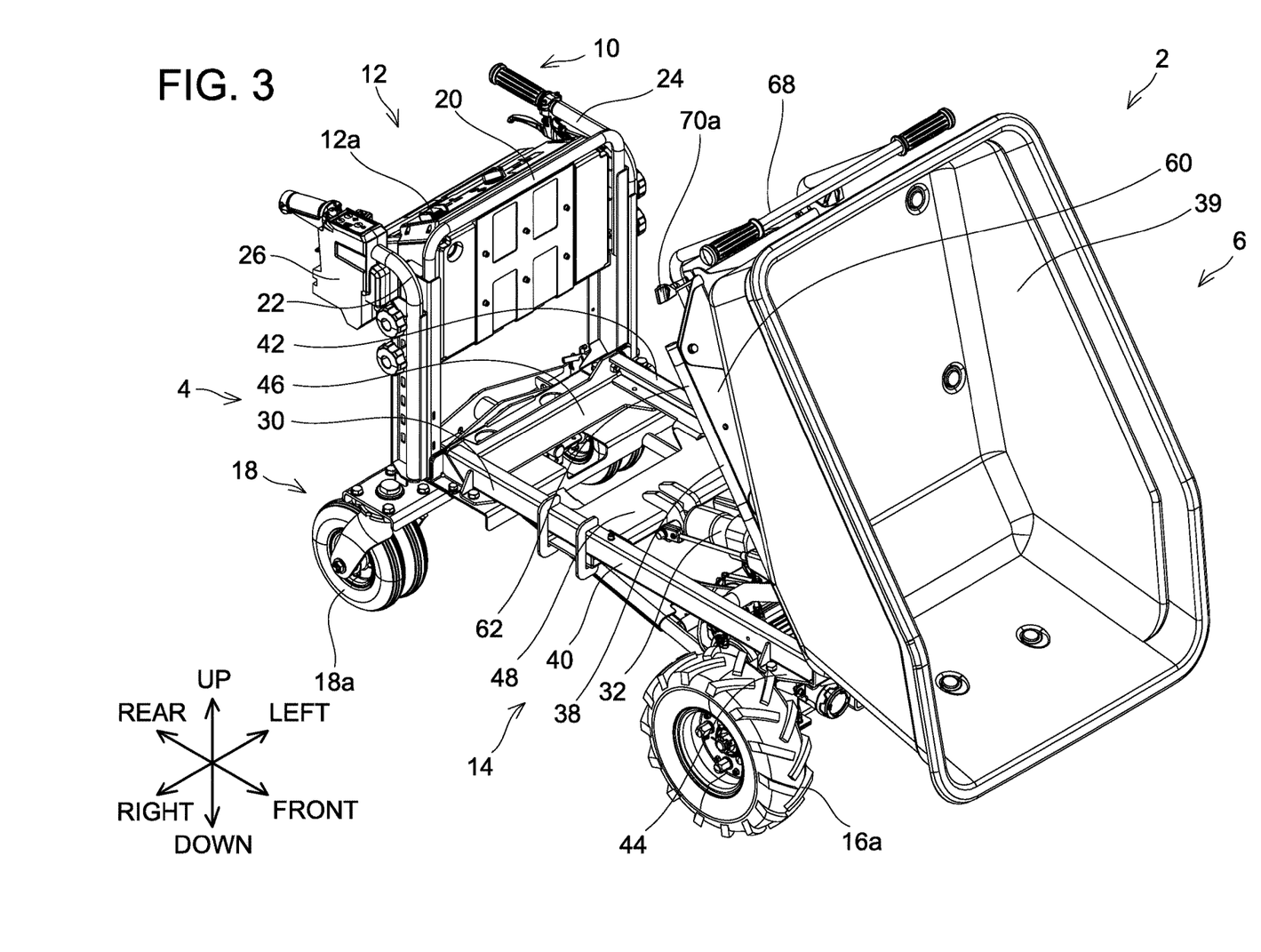
FIG. 3 is a perspective view of the cart 2 with a rotating frame 34 tilted relative to a fixed frame 30, when the cart 2 is viewed from upper-front-right side.
Figure 4:
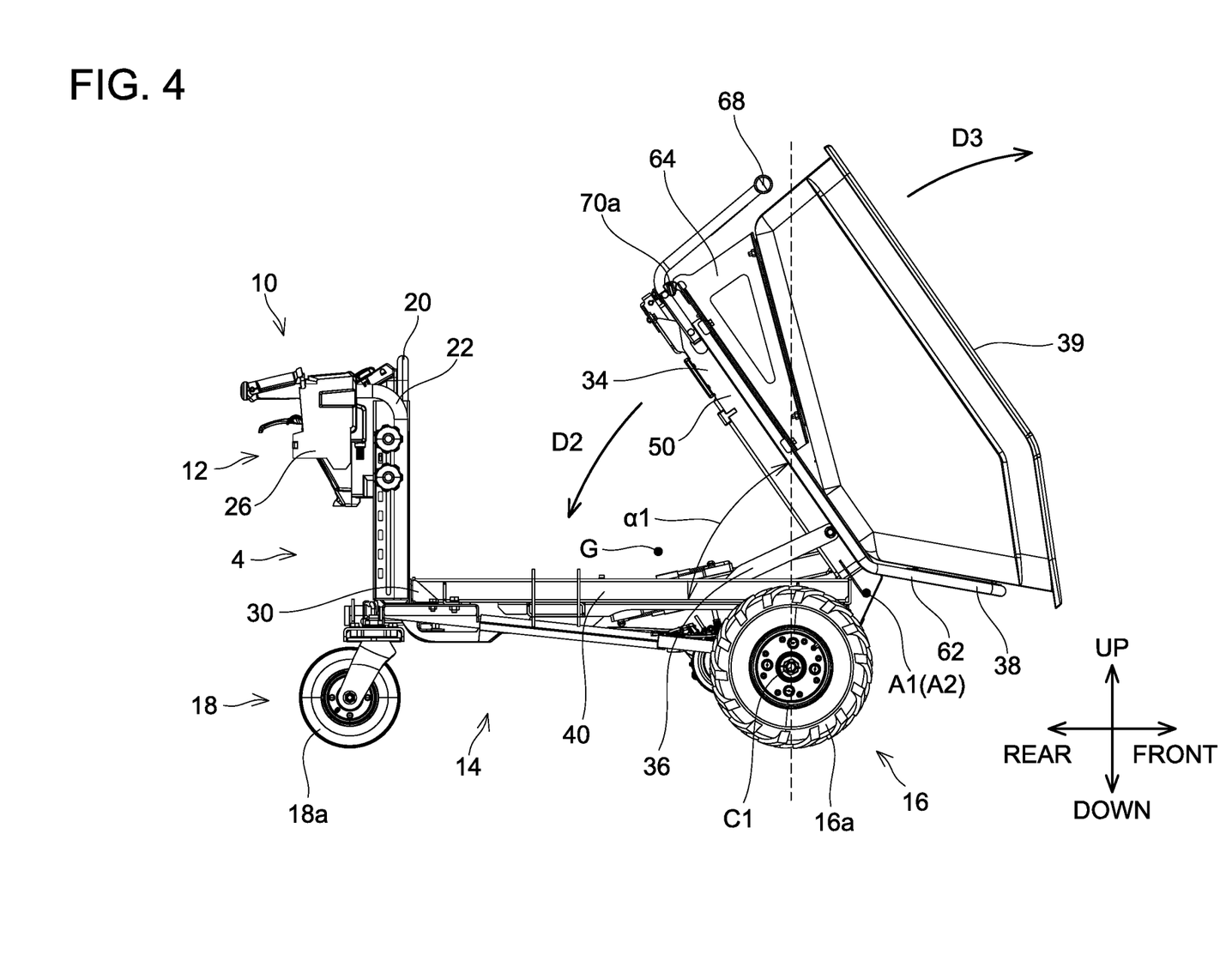
FIG. 4 is a right side view of the cart 2 in the state of FIG. 3.
Figure 5:
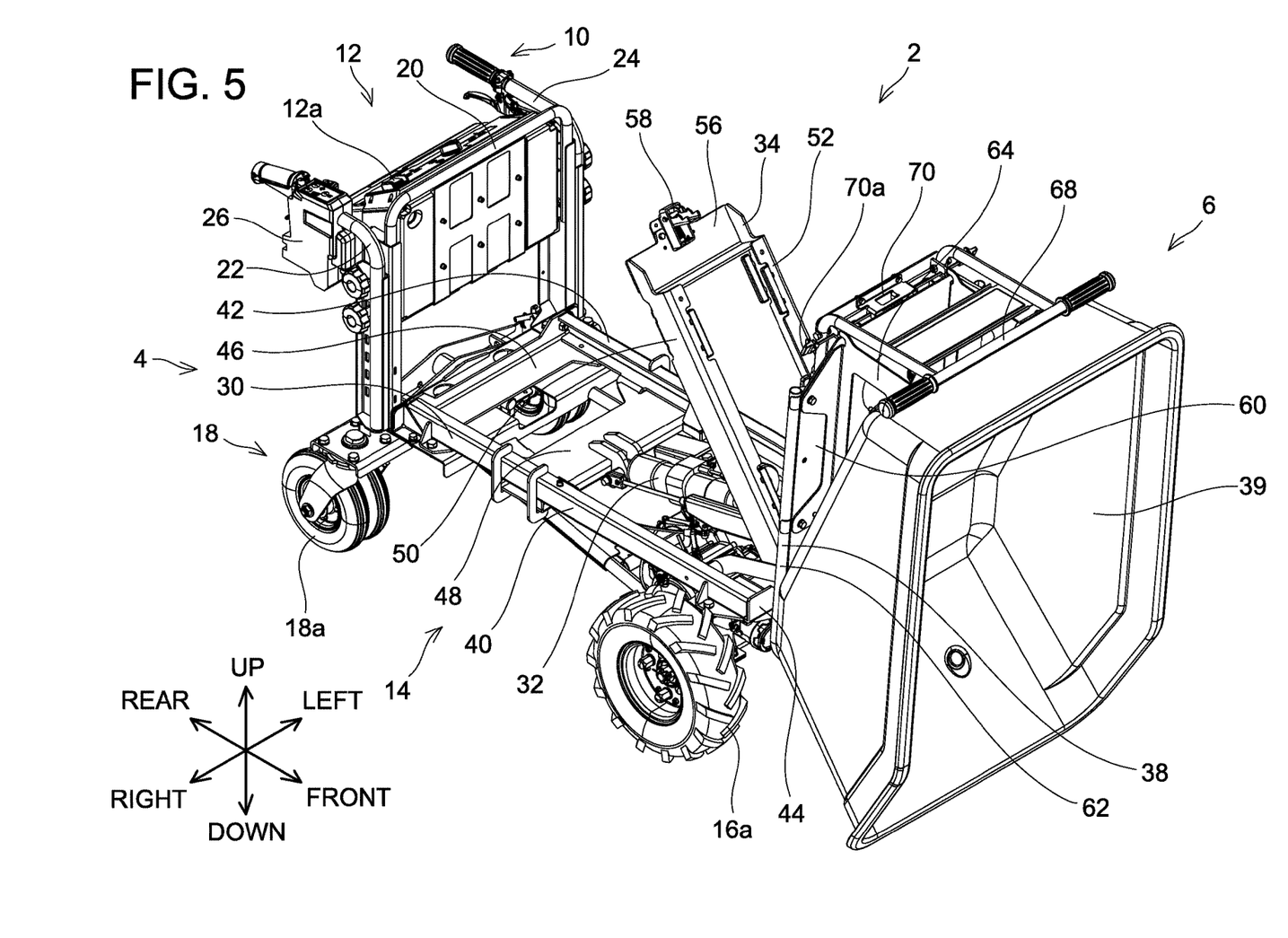
FIG. 5 is a perspective view of the cart 2 with the rotating frame 34 tilted relative to the fixed frame 30 and a container frame 38 tilted relative to the rotating frame 34, when the cart 2 is viewed from upper-front-right side.
Figure 6:
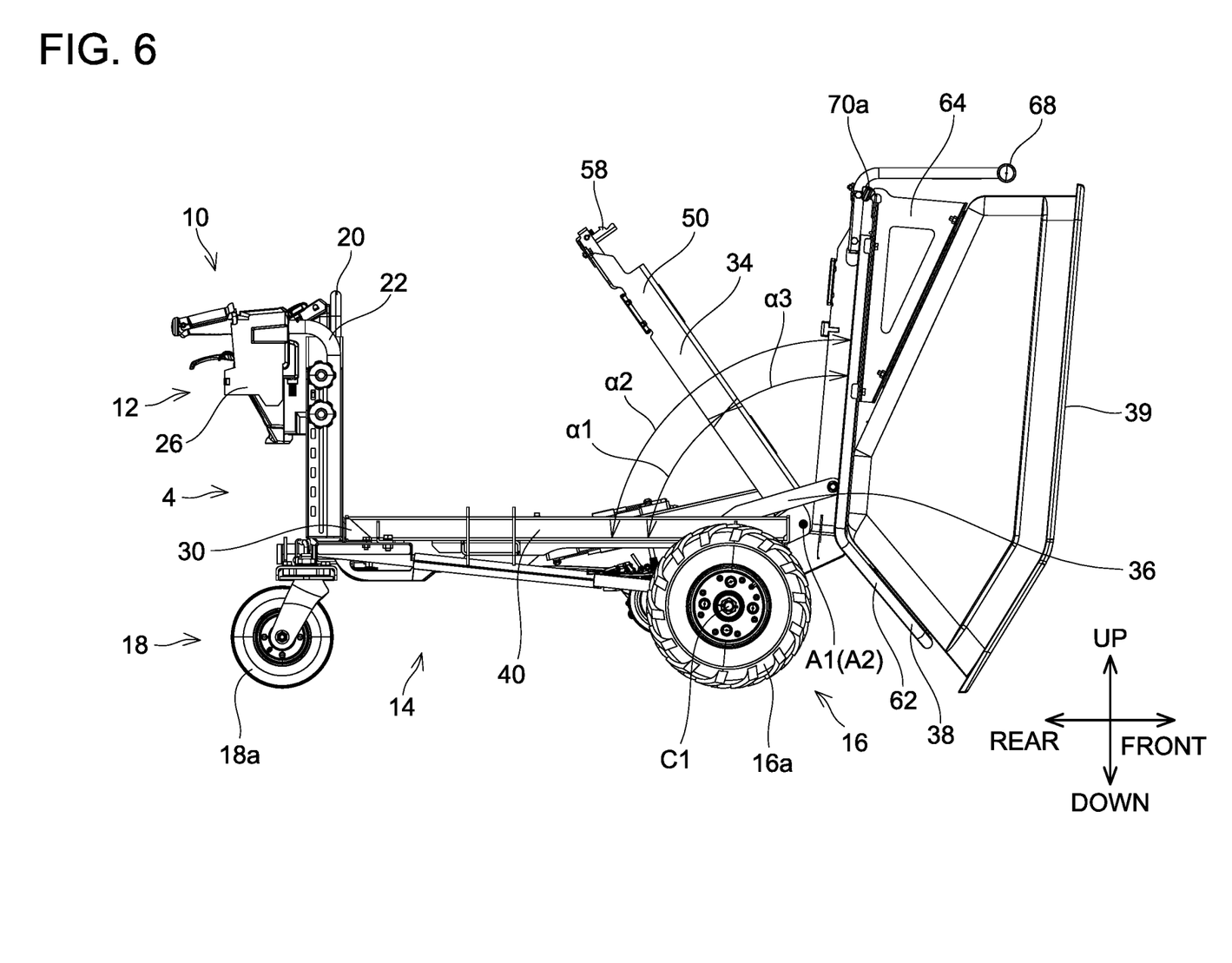
FIG. 6 is a right side view of the cart 2 in the state of FIG. 5.
Figure 7:
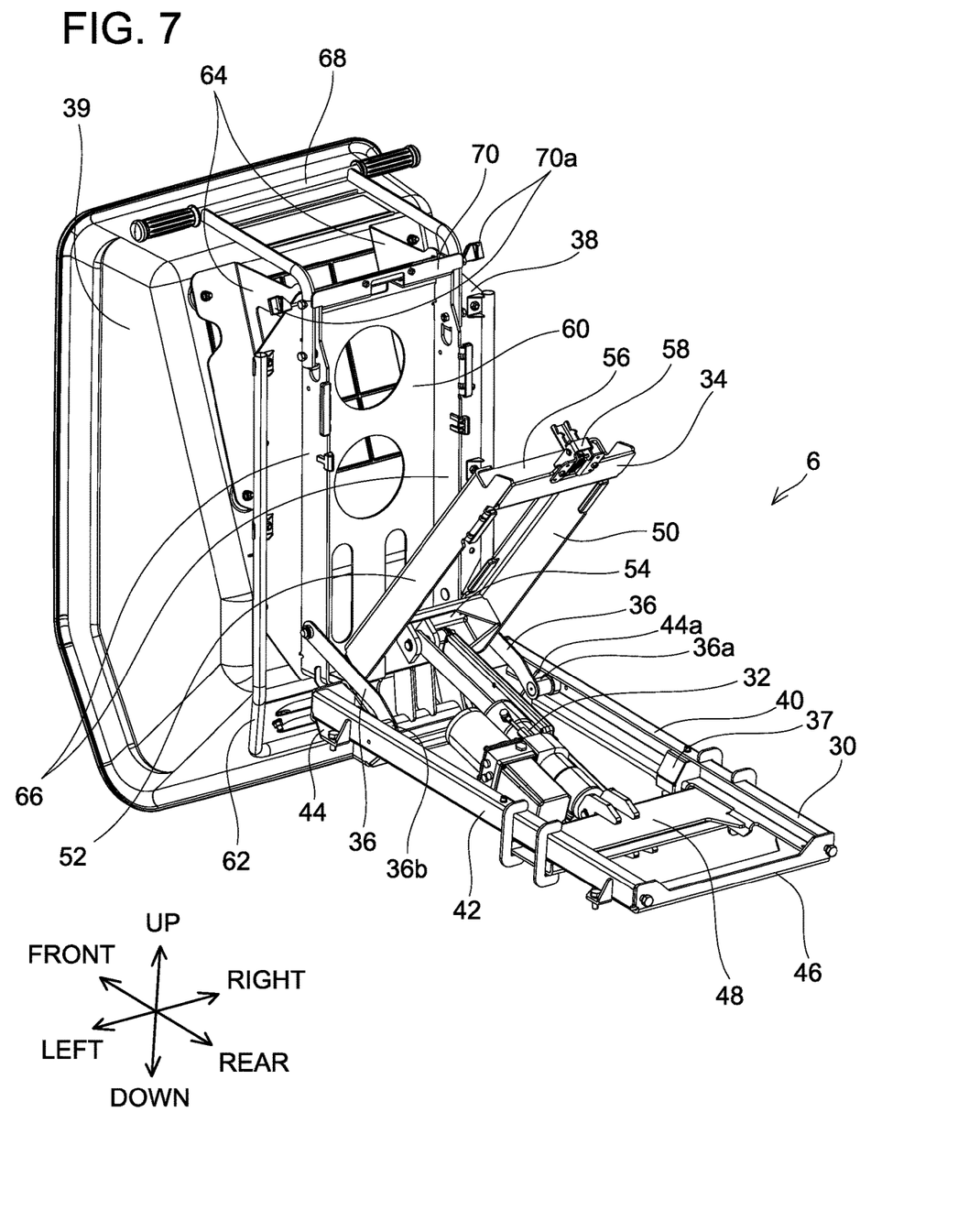
FIG. 7 is a perspective view of a container unit 6 according to the embodiment, when the container unit 6 is viewed from upper-rear-left side.

Referring to FIGS. 1 to 7, a cart 2 will be described. The cart 2 is a handcart. As shown in FIGS. 1 to 6, the cart 2 includes a chassis unit 4 and a container unit 6. FIGS. 1, 3, and 5 each shows a perspective view of the cart 2 when the cart 2 is viewed from upper-front-right side. FIG. 2 is a right side view of the cart 2 in the state of FIG. 1, FIG. 4 is a right side view of the cart 2 in the state of FIG. 3, and FIG. 6 is a right side view of the cart 2 in the state of FIG. 5. FIG. 7 shows the container unit 6 of the cart 2 when the container unit 6 is viewed from upper-rear-left side.

Configuration of Vehicle Unit 4

As shown in FIG. 1, the chassis unit 4 includes a handle unit 10, a battery box 12, a chassis frame 14, front wheels 16, and rear wheels 18. The chassis frame 14 connects the front wheels 16 to the rear wheels 18. The front wheels 16 include a right front wheel 16a and a left front wheel 16b. By a motor (not shown) being driven, the front wheels 16 (i.e., the right front wheel 16a and the left front wheel 16b) rotate in a forward direction or in a reverse direction. The rear wheels 18 include a right rear wheel 18a and a left rear wheel (not shown). The battery box 12 houses a battery pack (not shown). Further, a container operation switch 12a for operating an actuator 32 (which will be described later, see FIG. 5), a remaining charge display unit for displaying the remaining amount of the battery pack, and the like are disposed in/on the battery box 12. The motor is supplied with electric power from the battery pack. Operation of the motor is controlled by a control board (not shown).

As shown in FIG. 5, the handle unit 10 includes a handle base 20, a right handle 22, and a left handle 24. The handle base 20, the right handle 22, and the left handle 24 are screwed to the chassis frame 14. The battery box 12 is screwed to the handle base 20. A switch box 26 is disposed on the right handle 22. A switch for driving the motor, a switch for switching the rotation direction of the front wheels 16, and the like are disposed in the switch box 26.

Configuration of Container Unit 6

As shown in FIGS. 3 to 7, the container unit 6 includes a fixed frame 30, the actuator 32, a rotating frame 34, support arms 36 (see FIG. 7), container frame 38, and a bucket 39. The bucket 39 has a box shape with its upper side open.

As shown in FIG. 5, the fixed frame 30 includes a right channel 40, a left channel 42, a front plate 44, a rear plate 46, and a reinforcing frame 48. All of the right channel 40, the left channel 42, the front plate 44, the rear plate 46, and the reinforcing frame 48 are constituted of a steel material. The right channel 40 and the left channel 42 extend in a front-rear direction. The front plate 44 is welded to a front end of the right channel 40 and to a front end of the left channel 42. The rear plate 46 is welded to a rear end of the right channel 40 and to a rear end of the left channel 42. The front plate 44 and the rear plate 46 is screwed to the chassis frame 14. The reinforcing frame 48 extends in a right-left direction, a right end thereof is welded to the right channel 40, and a left end thereof is welded to the left channel 42. The actuator 32 is connected to a front surface of the reinforcing frame 48.

As shown in FIG. 7, the rotating frame 34 includes a right frame 50, a left frame 52, a front frame 54, a rear frame 56, and a latch receiver 58. All of the right frame 50, the left frame 52, the front frame 54, and the rear frame 56 are constituted of a steel material. The right frame 50 and the left frame 52 extend in the front-rear direction. A front end of the right frame 50 and a front end of the left frame 52 are rotatably coupled to a front end of the front plate 44 of the fixed frame 30 and a front end of a lower frame 66 (which will be described later) of the container frame 38, such that the front end of the right frame 50 and the front end of the left frame 52 can rotate about a rotation axis A1 (see FIGS. 4 and 6) along the right-left direction. The rotation axis A1 is located forward of a rotational axis C1 of the right front wheel 16a. The front frame 54 extends in the right-left direction between the vicinity of the front end of the right frame 50 and the vicinity of the front end of the left frame 52. The rear frame 56 extends in the right-left direction between a rear end of the right frame 50 and a rear end of the left frame 52. The latch receiver 58 is fixed near a center of the rear frame 56. The latch receiver 58 is located at a position corresponding to a latch mechanism 70 (which will be described later) of the container frame 38.

As shown in FIG. 7, the container frame 38 includes a base plate 60, a base pipe 62, an upper frame 64, a lower frame 66, a handle 68 configured to be gripped by a user, and the latch mechanism 70. All of the base plate 60, the base pipe 62, the upper frame 64, and the lower frame 66 are constituted of a steel material. The base plate 60 is disposed along the front-rear direction and the right-left direction. The base pipe 62 extends along a lower surface of a front lower portion of the bucket 39 and also extends along a lower surface of the base plate 60 in the front-rear direction. The base pipe 62 is screwed to the front lower portion of the bucket 39 and the base plate 60. The upper frame 64 is disposed along the front-rear direction and an up-down direction between a lower surface of a rear lower portion of the bucket 39 and an upper surface of the base plate 60. The upper frame 64 is screwed to the rear lower portion of the bucket 39 and the base plate 60. The lower frame 66 extends along the lower surface of the base plate 60 in the front-rear direction. A front end of the lower frame 66 is rotatably coupled to the front end of the front plate 44 of the fixed frame 30 such that the front end of the lower frame 66 can rotate about a rotation axis A2 (see FIGS. 4 and 6) along the right-left direction. As shown in FIGS. 4 and 6, the rotation axis A2 substantially coincides with the rotation axis A1. The handle 68 is located rearward of the bucket 39 under a state where the container frame 38 is not rotated. The handle 68 is screwed to the lower frame 66. The latch mechanism 70 is disposed below the handle 68 under a state where the container frame 38 is not rotated. The latch mechanism 70 is fixed to the base plate 60 and the lower frame 66. The latch mechanism 70 includes an unlatching knob 70a. The latch mechanism 70 engages with the latch receiver 58 when the container frame 38 is tilted relative to the rotating frame 34 in a direction that brings a rear end of the container frame 38 closer to a rear end of the rotating frame 34. When the user operates the unlatching knob 70a with the latch mechanism 70 engaged with the latch receiver 58, the engagement between the latch mechanism 70 and the latch receiver 58 is thereby released. When the latch mechanism 70 is engaged with the latch receiver 58, the container frame 38 is placed on the rotating frame 34.

The support arms 36 shown in FIG. 7 are constituted of a steel material. Upper ends of the support arms 36 are coupled to the vicinity of the front end of the lower frame 66 of the container frame 38. Lower ends of the support arms 36 include rollers 36a and 36b, respectively. The rollers 36a and 36b are supported so as to be movable in the right channel 40 and the left channel 42 of the fixed frame 30, respectively, in the front-rear direction. A front stopper 44a of the front plate 44 of the fixed frame 30 is disposed in the right channel 40. Further, a rear stopper 37 is disposed rearward of the front stopper 44a in the right channel 40. The front stopper 44a and the rear stopper 37 restrict a movable range of the roller 36a in the front-rear direction. Although not shown, a front stopper and a rear stopper which restrict a movable range of the roller 36b in the front-rear direction are disposed in the left channel 42. As shown in FIGS. 3 and 4, when the latch mechanism 70 is engaged with the latch receiver 58, the rotating frame 34 and the container frame 38 are rotated integrally relative to the fixed frame 30. Further, as shown in FIGS. 5 and 6, when the latch mechanism 70 is disengaged from the latch receiver 58, the container frame 38 is rotated relative to the fixed frame 30 and the rotating frame 34.

The actuator 32 shown in FIG. 7 is a linear actuator configured to contract and expand, such as a hydraulic cylinder. The actuator 32 is connected to a hydraulic pump (not shown). One end of the actuator 32 is rotatably supported by the reinforcing frame 48 of the fixed frame 30 such that the one end of the actuator 32 can rotate with the right-left direction as its rotation axis. Another end of the actuator 32 is rotatably supported by the front frame 54 of the rotating frame 34 such that the other end of the actuator 32 can rotate with the right-left direction as its rotation axis. The actuator 32 is connected to the battery box 12 of the chassis unit 4 via a power cable (not shown). The actuator 32 is supplied with electric power from the battery pack (not shown) in the battery box 12. The operation of the actuator 32 is controlled by the control board (not shown).

Referring to FIGS. 1 to 4, how the rotating frame 34 moves by the actuator 32 contracting and expanding will be described. When the actuator 32 expands in the state shown in FIG. 2, the rotating frame 34 is thereby rotated relative to the fixed frame 30 in a direction D1 that brings a rear end of the rotating frame 34 away from a rear end of the fixed frame 30. Further, when the actuator 32 contracts in the state shown in FIG. 4, the rotating frame 34 is rotated relative to the fixed frame 30 in a direction D2 that brings the rear end of the rotating frame 34 closer to the rear end of the fixed frame 30. The control board controls the actuator 32 such that the length of the actuator 32 does not become shorter than the length of the actuator 32 shown in FIGS. 1 and 2. Specifically, the control board does not contract the actuator 32 even when an operation for contracting the actuator 32 is performed in the state of FIGS. 1 and 2. Thus, the state shown in FIGS. 1 and 2 is a state where the actuator 32 is the most contracted. In the state where the actuator 32 is most contracted, the rotating frame 34 and the container frame 38 are substantially parallel to the fixed frame 30. The control board further controls the actuator 32 such that the length of the actuator 32 does not become longer than the length of the actuator 32 shown in FIGS. 3 and 4. Specifically, the control board does not expand the actuator 32 even when an operation for expanding the actuator 32 is performed in the state of FIGS. 3 and 4. Thus, the state shown in FIGS. 3 and 4 is a state where the actuator 32 is most expanded. In the state where the actuator 32 is most expanded, the rotating frame 34 and the container frame 38 are tilted to the fixed frame 30, an angle between the fixed frame 30 and the rotating frame 34 is a first rotation angle $\alpha 1$, and an angle between the fixed frame 30 and the container frame 38 is substantially equal to the first rotation angle $\alpha 1$. It should be noted that the state where the actuator 32 is most expanded indicates one of a state where the actuator 32 cannot mechanically expand any further and a state where the actuator 32 is controlled not to expand further. The state where the actuator 32 cannot mechanically expand any further is a state where a piston of the actuator 32, which is a hydraulic cylinder, is in contact with a farther end of the cylinder. Moreover, the state where the actuator 32 is controlled not to expand further is a state where the supply of hydraulic fluid to the actuator 32 is restricted by the control board or the like to prevent the actuator 32 from expanding further, when the piston of the actuator 32 is not in contact with the farther end of the cylinder. In this case, the control board detects an expansion amount of the actuator 32 by a sensor such as a limit switch and restricts the supply of hydraulic fluid to the actuator 32 when determining that the expansion amount of the actuator 32 has reached its maximum.

As shown in FIG. 4, when the rotation angle of the rotating frame 34 and the container frame 38 relative to the fixed frame 30 is the first rotation angle $\alpha 1$, a position of center of gravity G of the cart 2 in the front-rear direction is rearward of the rotational axis C1 of the right front wheel 16a. Here, the center of gravity G of the cart 2 means a center of gravity of the cart 2 with the bucket 39 being empty. If the position of center of gravity G of the cart 2 in the front-rear direction shifts forward beyond the rotational axis C1 of the right front wheel 16a, a moment due to gravity that attempts to lift up a rear portion of the cart 2 is thereby applied to the cart 2 and the rear wheels 18 are lifted up. Setting the first rotation angle $\alpha 1$ as above in the cart 2 of the embodiment suppresses the position of center of gravity G of the cart 2 in the front-rear direction from shifting forward beyond the rotational axis C1 of the right front wheel 16a, and thus prevents the lifting of the rear wheel 18.

When the user operates the unlatching knob 70a to disengage the latch mechanism 70 from the latch receiver 58 in the state shown in FIGS. 3 and 4, the container frame 38 thereby becomes rotatable in a direction D3 relative to the rotating frame 34 and the fixed frame 30. As shown in FIGS. 5 and 6, the user can rotate the container frame 38 until an angle between the fixed frame 30 and the container frame 38 becomes a second rotation angle $\alpha 2$. The second rotation angle $\alpha 2$ is larger than the first rotation angle $\alpha 1$ by a third rotation angle $\alpha 3$. A rotatable range of the container frame 38 relative to the fixed frame 30 is defined by the stoppers in the right channel 40 and the left channel 42 of the fixed frame 30. The user can almost completely unload soil, fertilizer, and the like in the bucket 39 by setting the angle between the fixed frame 30 and the container frame 38 to the second rotation angle $\alpha 2$. In a variant, a gas spring may be used to define the rotatable range of the container frame 38 relative to the fixed frame 30, instead of the stoppers in the right channel 40 and the left channel 42 of the fixed frame 30. In this variant, the gas spring is disposed between the fixed frame 30 and the container frame 38. The gas spring biases the container frame 38 upward relative to the fixed frame 30. When the gas spring is most extended, the container frame 38 cannot be rotated further relative to the fixed frame 30. As above, the gas spring can define the rotatable range of the container frame 38 relative to the fixed frame 30.

As described above and shown in FIGS. 1 to 7, the cart 2 according to one embodiment includes the fixed frame 30 fixed to the chassis frame 14, the actuator 32, the rotating frame 34 configured to be rotated relative to the fixed frame 30 by the actuator 32, and the container frame 38 configured to be rotated relative to the fixed frame 30 and to be rotated with the rotating frame 34 relative to the fixed frame 30 when the rotating frame 34 is rotated relative to the fixed frame 30 by the actuator 32. As shown in FIG. 6, the rotating frame 34 is rotatable up to a position at which the angle between the fixed frame 30 and the rotating frame 34 becomes the first rotation angle $\alpha 1$, and the container frame 38 is rotatable up to a position at which the angle between the fixed frame 30 and the container frame 38 becomes the second rotation angle $\alpha 2$, which is greater than the first rotation angle $\alpha 1$. In the above-described configuration, when the rotating frame 34 is rotated relative to the fixed frame 30 by the actuator 32 and the angle between the fixed frame 30 and the rotating frame 34 becomes the first rotation angle $\alpha 1$, the angle between the fixed frame 30 and the container frame 38 becomes substantially equal to the first rotation angle $\alpha 1$. The maximum rotation angle of the rotating frame 34 relative to the fixed frame 30 is the first rotation angle α1 which is smaller than the second rotation angle α2. Since the maximum rotation angle of the rotating frame 34 relative to the fixed frame 30 (i.e., the first rotation angle α1) is relatively small, the position of center of gravity of the cart 2 is suppressed from greatly shifting forward even when the rotating frame 34 is rotated relative to the fixed frame 30 by the actuator 32. Thus, lifting of the rear portion of the cart 2 is prevented. Further, since the maximum rotation angle of the container frame 38 relative to the fixed frame 30 (i.e., the second rotation angle α2) is relatively large, a lot of soil, fertilizer, and the like in the bucket 39 can be unloaded, which is highly convenient for the user.

As shown in FIGS. 1 to 7, the cart 2 according to an embodiment includes the front wheels 16 and the rear wheels 18. Then, as shown in FIG. 4, when the container frame 38 is placed on the rotating frame 34, the center of gravity G of the cart 2 is positioned rearward of the rotational axis C1 of the right front wheel 16a of the front wheels 16. This configuration can surely prevent the rear wheels 18 from lifting up, even when the rotating frame 34 is rotated with the container frame 38 placed on the rotating frame 34. Thus, the configuration can further improve safety on use of the cart 2.

As shown in FIGS. 1 to 7, in the cart 2 according to an embodiment, the container frame 38 includes the handle 68 configured to be gripped by the user. This configuration enables the user to easily rotate the container frame 38.

As shown in FIGS. 1 to 7, in the cart 2 according to an embodiment, the rotation axis of the rotating frame 34 substantially coincides with the rotation axis of the container frame 38. This configuration allows the rotating frame 34 and the container frame 38 to be attached to the fixed frame 30. This simplifies the configuration of the cart 2.

As shown in FIGS. 1 to 7, the cart 2 according to an embodiment includes the front wheels 16 and the rear wheels 18. Then, as shown in FIG. 6, when the rotation angle of the rotating frame 34 relative to the fixed frame 30 is the first rotation angle α1 and the rotation angle of the container frame 38 relative to the fixed frame 30 is the second rotation angle α2, the center of gravity G of the cart 2 is positioned rearward of the rotational axis C1 of the right front wheel 16a. This configuration can surely prevent the rear wheels 18 of the cart 2 from lifting up. Thus, the configuration can further improve safety on use of the cart 2.

Correspondence Relationships

The cart 2 is an example of "handcart". The fixed frame 30 is an example of "support frame". The container frame 38 and the bucket 39 are an example of "container".

While specific examples of the present disclosure have been described above in detail, these examples are merely illustrative and place no limitation on the scope of the patent claims. The technology described in the patent claims also encompasses various changes and modifications to the specific examples described above.

(First Variant) The chassis frame 14 may be an example of "support frame". In the present variant, the handcart does not include the fixed frame 30. Further, the rotating frame 34 and the container frame 38 are rotatably coupled to the chassis frame 14.

(Second Variant) When the rotation angle of the rotating frame 34 and the container frame 38 relative to the fixed frame 30 is the first rotation angle α1, the position of center of gravity G of the cart 2 in the front-rear direction may be positioned slightly forward than the rotational axis C1 of the right front wheel 16a. That is, when the rotation angle of the rotating frame 34 and the container frame 38 relative to the fixed frame 30 is the first rotation angle α1, the position of center of gravity G of the cart 2 in the front-rear direction may be at any position that does not cause the rear wheels 18 to lift up.

(Third Variant) The container frame 38 may not include the handle 68. For example, the bucket 39 may include "a grip portion".

(Fourth Variant) The rotation axis A1 of the rotating frame 34 may be different from the rotation axis A2 of the container frame 38. For example, the rotation axis A2 of the container frame 38 may be positioned rearward of the rotation axis A1 of the rotating frame 34.

(Fifth Variant) In the above embodiment, the operation (i.e., length) of the actuator 32 is restricted by the control board. In the variant, a stopper for preventing the actuator 32 from becoming shorter than that in FIGS. 1 and 2, and a stopper for preventing the actuator 32 from becoming longer than that in FIGS. 3 and 4 may be disposed. In this configuration, the operation of the actuator 32 does not have to be restricted by the control board. Further, in another variant, a mechanical stopper that defines the rotatable range of the rotating frame 34 relative to the fixed frame 30 may be disposed between the fixed frame 30 and the rotating frame 34. In this variant, the mechanical stopper is arranged such that the rotation angle of the rotating frame 34 relative to the fixed frame 30 at a position where the rotating frame 34 is in contact with the mechanical stopper corresponds to the first rotation angle α1.

(Sixth Variant) The "actuator" is not limited to a hydraulic cylinder, and may be a ball screw, a hydraulic motor, an electric motor, or the like. Generally speaking, the "actuator" may be any element as long as it includes a mechanism configured to rotate the rotating frame 34 relative to the fixed frame 30. Further, the "actuator" may be driven manually, human power such as foot operation, or the like.

(Seventh Variant) The "handcart" may be a three-wheeled cart, crawler cart, or the like.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A handcart comprising:
a support frame;
an actuator;
a rotating frame configured to be rotated relative to the support frame by the actuator; and
a container configured to be rotated relative to the support frame,
wherein
a rotation axis of the rotating frame about which the rotating frame is rotated relative to the support frame substantially coincides with a rotation axis of the container about which the container is rotated relative to the support frame,
the container is configured to be rotated with the rotating frame relative to the support frame when the rotating frame is rotated relative to the support frame by the actuator, the rotating frame is rotatable up to a position at which an angle between the support frame and the rotating frame becomes a first rotation angle, and the container is rotatable up to a position at which an angle between the support frame and the container becomes a second rotation angle, the second rotation angle being greater than the first rotation angle.

2. The handcart according to claim 1, further comprising:
a front wheel; and
a rear wheel,
wherein under a state where the angle between the support frame and the rotating frame is the first rotation angle and the angle between the support frame and the container is substantially equal to the first rotation angle, a center of gravity of the handcart is positioned rearward of a rotational axis of the front wheel.

3. The handcart according to claim 1, wherein the container comprises a handle configured to be gripped by a user.

4. A handcart comprising:
a support frame;
an actuator;
a rotating frame configured to be rotated relative to the support frame by the actuator; and
a container configured to be rotated relative to the support frame,
wherein
the container is configured to be rotated with the rotating frame relative to the support frame when the rotating frame is rotated relative to the support frame by the actuator,
the rotating frame is rotatable up to a maximum position at which an angle between the support frame and the rotating frame becomes a first rotation angle, and
the container is rotatable up to a maximum position at which an angle between the support frame and the container becomes a second rotation angle, and an angle between the rotatable frame and the container becomes a third rotation angle,
wherein a sum of first rotation angle and the third rotation angle equals the second rotation angle.

5. A handcart comprising:
a support frame;
an actuator;
a rotating frame configured to be rotated relative to the support frame by the actuator; and
a container configured to be rotated relative to the support frame,
wherein
the container is configured to be rotated with the rotating frame relative to the support frame when the rotating frame is rotated relative to the support frame by the actuator,
the rotating frame is rotatable up to a position at which an angle between the support frame and the rotating frame becomes a first rotation angle, the first rotation angle being a maximum rotation angle between the support frame and the rotating frame, and
the container is rotatable up to a position at which an angle between the support frame and the container becomes a second rotation angle, the second rotation angle being a maximum rotation angle between the support frame and the container,
wherein the second rotation angle is greater than the first rotation angle.

6. The handcart according to claim 5, wherein the rotating frame includes a right frame, a left frame, a front frame, and a rear frame, wherein the right frame and the left frame both extend in a front-rear direction of the handcart, and wherein the front frame and rear frame both extend in a right-left direction of the handcart.

7. The handcart according to claim 6, wherein a front end of the right frame and a front end of the left frame are rotatably coupled to the support frame.

8. The handcart according to claim 5, wherein a rear end of the rotating frame is rotated away from a rear end of the support frame when the actuator expands.

* * * * *